(12) United States Patent
Kobayashi et al.

(10) Patent No.: US 8,370,406 B2
(45) Date of Patent: Feb. 5, 2013

(54) IMAGE TRANSMISSION APPARATUS, REGISTRATION METHOD, AND REGISTRATION PROGRAM

(75) Inventors: Minako Kobayashi, Ikeda (JP);
Hirohisa Miyamoto, Kobe (JP);
Takehisa Yamaguchi, Ikoma (JP);
Katsuhiko Akita, Amagasaki (JP);
Okihisa Yoshida, Amagasaki (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 717 days.

(21) Appl. No.: 12/243,141

(22) Filed: Oct. 1, 2008

(65) Prior Publication Data

US 2009/0100071 A1    Apr. 16, 2009

(30) Foreign Application Priority Data

Oct. 10, 2007    (JP) .................................. 2007-264665

(51) Int. Cl.
*G06F 12/00*    (2006.01)

(52) U.S. Cl. ........................................ 707/826; 707/828

(58) Field of Classification Search ........... 707/826–827
See application file for complete search history.

(56) References Cited

U.S. PATENT DOCUMENTS

| | | | |
|---|---|---|---|
| 7,239,434 | B2 | 7/2007 | Endo |
| 7,505,974 | B2 * | 3/2009 | Gropper ................................. 1/1 |
| 2002/0181442 | A1 * | 12/2002 | Rajani ............................ 370/352 |
| 2003/0120656 | A1 * | 6/2003 | Kageyama et al. ................ 707/9 |
| 2007/0073551 | A1 * | 3/2007 | Williams et al. ................... 705/1 |
| 2007/0263806 | A1 * | 11/2007 | Rathi et al. ................ 379/100.01 |
| 2008/0033635 | A1 * | 2/2008 | Obradovich et al. .......... 701/201 |
| 2009/0119758 | A1 * | 5/2009 | Tsuchiya ........................... 726/5 |

FOREIGN PATENT DOCUMENTS

CN    1496078    5/2004

(Continued)

OTHER PUBLICATIONS

Notification of Reason for Refusal issued in corresponding Japanese Patent Application No. 2007-264665, mailed Sep. 8, 2009, and English translation thereof.
Notification of First Office Action dated Oct. 8, 2010, issued in the corresponding Chinese Patent Application No. 200810169568.0, and an English Translation thereof.

(Continued)

*Primary Examiner* — James Trujillo
*Assistant Examiner* — Linh Black
(74) *Attorney, Agent, or Firm* — Buchanan Ingersoll & Rooney PC

(57) ABSTRACT

An image transmission apparatus is high in convenience, operability and reliability when newly registering a transmission destination to an address book. The apparatus obtains a list of destination names corresponding to recipients who have registered a recipient setting designating a transmission method; receives from a user a selection of whether to follow the recipient setting; receives from the user (a) if a selection to not follow the recipient setting has been received, a destination name and a transmission method to correspond thereto, and (b) if a selection to follow the recipient setting has been received, a selection of a destination name from the list; in the case of (a), registers the destination name and the transmission method in association as a candidate for the destination; and in the case of (b), registers the selected destination name with an indication that the recipient setting is to be followed, as a candidate.

8 Claims, 9 Drawing Sheets

FOREIGN PATENT DOCUMENTS

| | | |
|---|---|---|
| CN | 101009665 A | 8/2007 |
| JP | 2003-108479 A | 4/2003 |
| JP | 2003 244308 A | 8/2003 |
| JP | 2005-033733 A | 2/2005 |
| JP | 2006-20048 | 1/2006 |
| JP | 2006-020049 A | 1/2006 |

OTHER PUBLICATIONS

Official Action issued by the Chinese Patent Office on Nov. 24, 2011 in corresponding Chinese Patent Application No. 200810169568.0, and an English language translation of the Official Action.

* cited by examiner

FIG. 9

| DESTINATION LIST (PERSONAL ADDRESS BOOK) | | | GO TO AUTO ADDRESS BOOK INPUT SCREEN | |
|---|---|---|---|---|
| SELECT DESTINATION | | | | |
| PERSON A ADMIN | PERSON B XX BRANCH | PERSON C YY BRANCH | PERSON D ZZ FACTORY | PERSON E ACCOUNTS |
| PERSON F TECH GRP 1 | PERSON G TECH GRP 2 | PERSON H K CO. | PERSON J M CO. | PERSON K P CO. |
| PERSON L S CO. | PERSON M Q CO. | PERSON N X CO. | PERSON P Y CO. | PERSON R W CO. |
| TO MANUAL INPUT SCREEN | | PREV. PAGE | NEXT PAGE | CONFIRM SELECTION |

FIG. 10

DESTINATION LIST (AUTO ADDRESS BOOK)

MANUAL INPUT | AUTO ADDRESS BOOK INPUT

A B,C,D,E,F,G,H,I,J,K,L,M,N,O,P,Q,R,S,T,U,V,W,X,Y,Z,あ, ・・・

UserAA
UserAB
UserAB

IMAGE TRANSMISSION APPARATUS, REGISTRATION METHOD, AND REGISTRATION PROGRAM

This application is based on application No. 2007-264665 filed in Japan, the content of which is hereby incorporated by reference.

BACKGROUND OF THE INVENTION (1) Field of the Invention

The present invention relates to an image transmission apparatus, and in particular to a technique for improving usability when registering a candidate for a transmission destination.

(2) Description of the Related Art

In an MFP (Multi Function Peripheral) that consolidates the functions of a plurality of apparatuses such as a scanner, a printer, a copier, a FAX and the like into one apparatus, it is bothersome for a user to have to input a destination each time he or she transmits image data. For this reason, clients and the like are registered in an address book which is stored in advance in the MFP itself or in an address server or the like, and when transmitting image data, the user is able to call this address book and designate a destination from the address book. This eliminates the effort of inputting the destination.

Here, the user updates or newly registers a destination in the address book, the user must input the destination manually. In addition to being bothersome, there is also the potential for errors in input. This is problematic in terms of convenience, operability and reliability.

Techniques such as the following deal with this problem by updating an address book automatically.

Patent document 1 (Japanese Unexamined Patent Application Publication No. 2003-108479) discloses a technique whereby an address book is put in association profiles of destinations in a specific server, and then when there is a change in a profile, the address book data is automatically updated in accordance with the change in the profile. Patent Document 1 recites that this technique has the effect of enabling the address book data of an associated party to be updated by a user changing the profile.

Patent Document 2 (Japanese Unexamined Patent Application Publication No. 2003-244308) discloses a technique that enables an address book to be used via the Internet, and recites that this technique lightens the labor for physically registering, revising and deleting in individual devices.

Patent Document 3 (Japanese Unexamined Patent Application Publication No. 2005-33733) discloses the following technique. A change in the address of the user of a first terminal is instructed through the first terminal. The address of the user instructed through the first terminal is changed in a server. The user address changed in the server is then automatically changed in a corresponding address book in a second terminal. Patent Document 3 recites that this technique greatly lightens the burden on the users because neither the user of the first terminal nor the user of the second terminal is forced to carry out a bothersome procedure, and at the same time enables the addresses in the address book to always be kept current. In addition, inadvertent leaking of new addresses is also prevented.

Patent Document 4 (Japanese Unexamined Patent Application Publication No. 2006-20049) discloses a technique whereby a change is detected in destination information of a communication partner registered in an address book and in a DNS server, and then the destination information is automatically updated in an address book in correspondence with the change in the destination information in the DNS server. Patent Document 4 recites that this technique reduces the burden of organizing the address book, and prevents communication from being performed unnecessarily for reasons such as not being able to connect.

SUMMARY OF THE INVENTION

The present invention assumes an image transmission system in which each individual recipient has a plurality of destinations, and each recipient can select a destination arbitrarily according to a setting. The present invention provides an effective mechanism for a user to, for instance, newly register a transmission destination in an address book, and has an object of providing an image transmission apparatus, an image transmission method and an image transmission program that provide high convenience, operability and reliability compared to conventional techniques.

In order to achieve the stated object, an aspect of the present invention is an image transmission apparatus for transmitting image data in accordance with a transmission method designated by a recipient setting registered in an address server computer, the image transmission apparatus including: a destination name obtaining part operable to obtain, from the address server computer, a list of destination names that correspond to recipients who have registered, in the address server computer, a recipient setting designating a transmission method; a selection receiving part operable to, when a user registers a candidate as one of candidates for a destination for transmitting image data to in a case of the user being a sender of image data, receive from the user a selection of whether or not to follow the recipient setting; an input receiving part operable to, if the selection receiving part has received a selection to not follow the recipient setting, receive from the user (a) a destination name to be registered as one of the candidates for the destination and (b) a transmission method to correspond to the received destination name; a destination name selection part operable to, if the selection receiving part has received a selection to follow the recipient setting, receive, from the user, a selection of one of the destination names from the obtained list of destination names, as a destination name to be registered as one of the candidates for the destination; and a registration part operable to, if the input receiving part has received the input of the destination name and the transmission method, register the input destination name and the input transmission method in association with each other as one of the candidates for the destination, and if the destination name selection part has received the selection of the destination name, register the selected destination name in association with an indication that the recipient setting is to be followed, as one of the candidates for the destination.

In order to achieve the stated object, another aspect of the present invention is a registration method used when registering a candidate for a destination in an image transmission apparatus, the image transmission apparatus transmitting image data in accordance with a transmission method designated by a recipient setting registered in an address server computer, the registration method including: a destination name obtaining step of obtaining, from the address server computer, a list of destination names that correspond to recipients who have registered, in the address server computer, a recipient setting designating a transmission method; a selection receiving step of, when a user registers a candidate as one of candidates for a destination for transmitting image data to in a case of the user being a sender of image data, receiving from the user a selection of whether or not to follow the recipient setting; an input receiving step of, if a selection to not follow the recipient setting has been received in the selection receiving step, receiving from the user (a) a destination name to be registered as one of the candidates for the destination and (b) a transmission method to correspond to the received destination name; a destination name selection step of, if a selection to follow the recipient setting has been received in the selection receiving step, receive, from the user, a selection of one of the destination names from the obtained list of destination names, as a destination name to be registered as one of the candidates for the destination; and a registration step of, if the input of the destination name and the transmission method have been received in the input receiving step, register the input destination name and the input transmission method in association with each other as one of the candidates for the destination, and if the selection of the destination name has been received in the destination name selection step, register the selected destination name in association with an indication that the recipient setting is to be followed, as one of the candidates for the destination.

In order to achieve the stated object, yet another aspect of the present invention is a registration program for executing registration of a candidate for a destination in an image transmission apparatus, the image transmission apparatus transmitting image data in accordance with a transmission method designated by a recipient setting registered in an address server computer, the registration program causing the image transmission apparatus to execute: a destination name obtaining step of obtaining, from the address server computer, a list of destination names that correspond to recipients who have registered, in the address server computer, a recipient setting designating a transmission method; a selection receiving step of, when a user registers a candidate as one of candidates for a destination for transmitting image data to in a case of the user being a sender of image data, receiving from the user a selection of whether or not to follow the recipient setting; an input receiving step of, if a selection to not follow the recipient setting has been received in the selection receiving step, receiving from the user (a) a destination name to be registered as one of the candidates for the destination and (b) a transmission method to correspond to the received destination name; a destination name selection step of, if a selection to follow the recipient setting has been received in the selection receiving step, receive, from the user, a selection of one of the destination names from the obtained list of destination names, as a destination name to be registered as one of the candidates for the destination; and a registration step of, if the input of the destination name and the transmission method have been received in the input receiving step, register the input destination name and the input transmission method in association with each other as one of the candidates for the destination, and if the selection of the destination name has been received in the destination name selection step, register the selected destination name in association with an indication that the recipient setting is to be followed, as one of the candidates for the destination.

According to the stated structure, method and program, when, for instance, a user newly registers a transmission destination in an address book, the user is saved from having to manually input the destination. This eliminates bothersome operations, and lessens the likelihood of input errors, and therefore is user-friendly, and provides high convenience, operability and reliability.

Here, the destination name selection part, if the selection receiving part has received the selection that the recipient setting is to be followed, may display the list of the destination names obtained by the obtaining unit, and prompt the user to select one of the destination names from the displayed list.

According to the stated structure, a list of destination names for which recipient settings have been made is displayed, and the user is prompted to select one of the destination names. This is user-friendly, and provides extremely high operability.

Here, the address server computer may have registered therein data of a personal address book that is a list of the destination candidates and is one of a plurality of personal address books each registered by a different one of a plurality of users, and the image transmission apparatus may further include: a candidate obtaining part operable to obtain, from the address server computer, the data of the personal address book registered by the user, when the user logs in; a transmission instruction receiving part operable to, in the case of the user being the sender of image data, display the personal address book registered by the user, and receive, from the user, an instruction showing that the image data is to be transmitted to a destination selected from the personal address book; and a transmitting part operable to, based on the received instruction, (a) when a transmission method is registered for the selected destination, transmit the image data in accordance with the transmission method registered for the selected destination, and (b) when an indication showing that the recipient setting is to be followed is registered for the selected destination, transmit the image data in accordance with the transmission method designated by the corresponding recipient setting registered in the address server computer.

According to the stated structure, a destination candidate list is registered for individual use by the user, and this destination candidate list is obtained when the user logs in. Therefore, the user can always refer to the same list regardless of which image transmission apparatus he/she logs in to. This provides extremely high operability.

Here, the destination name obtaining part may obtain the destination name list in addition to the data of the personal address book when the user logs in.

According to the stated structure, when the user logs in, a list of destination names for which recipient settings have been made is obtained. Therefore, this list can be used promptly whenever necessary, without having to wait for processing to download the list to be performed. This provides extremely high operability.

Here, the transmission instruction receiving part may further, in the case of the user being the sender of image data, display the obtained list of the destination names instead of the personal address book, and receive, from the user, an instruction showing that the image data is to be transmitted to a destination corresponding to a destination name selected from the list of destination names, and the transmitting part may transmit the image data in accordance with the transmission method designated by the recipient setting registered, in the address server computer, in correspondence with the destination name selected from the list of destination names.

According to the stated structure, a list of destination names for which recipient settings have been made is displayed, and a selection of a destination name to transmit the image data to is received from the user from the displayed list. Therefore, even if a destination candidate has not been registered in advance, the image data can be simply and easily transmitted in accordance with the recipient setting. This provide high convenience and operability.

Here, the image transmission apparatus may further include: a recipient setting part operable to set, in the address server computer, a preferred transmission method for transmitting image data to the user in a case of the user being a recipient of image data.

According to the stated structure, the user can set a transmission method that he/she prefers for when he/she is the recipient. This is highly convenient.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 9 shows a display example of a list of destination names;

FIG. 10 shows a display example of a list of destination names contained in the auto address book.

DESCRIPTION OF THE PREFERRED EMBODIMENTS

Figure 1:
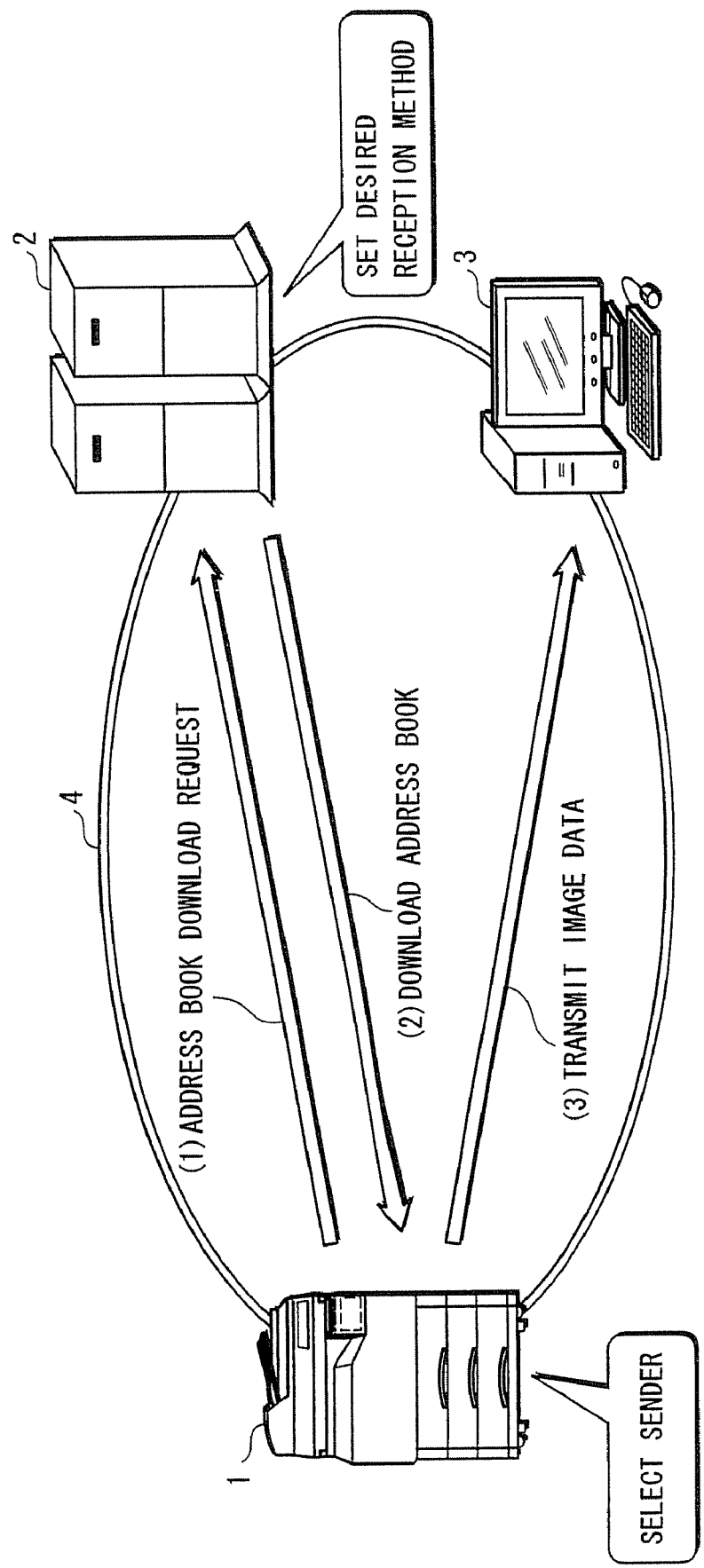
FIG. 1 shows an overview of an entire image transmission system in an embodiment of the present invention.

FIG. 1 shows an overview of an image transmission system in an embodiment of the present invention.

As shown in FIG. 1, the image transmission system of the present embodiment includes an image transmission apparatus 1, an address server 2 (server computer), a personal computer 3, and a network 4. Note that although for simplicity of explanation only one of each apparatus is shown, ordinarily the number of apparatuses is different to this. For instance, although the image transmission system may include only one or a few address servers 2 at the most and all of these may operate as one, the image transmission system ordinarily includes numerous image transmission apparatuses 1 and personal computers 3, that have equivalent functions to each other and operate independently of each other.

The image transmission apparatus 1 is, for instance, an MFP, and has a function of transmitting image data generated by scanning a document, image data stored therein, or image data transmitted from the personal computer of a sender. The image transmission apparatus 1 is capable of transmitting the image data in various ways such as facsimile or email.

FIG. 1 shows (1) the image transmission apparatus 1 making a download request to the address server 2 for a personal address book and an auto address book, (2) data of the personal address book and data of the auto address book being downloaded to the image transmission apparatus 1 from the address server 2 based on the request, the sender selecting a destination for image data mainly from the downloaded personal address book and auto address book, and (3) the image data being transmitted to the personal computer 3 of the selected destination.

Figure 2:
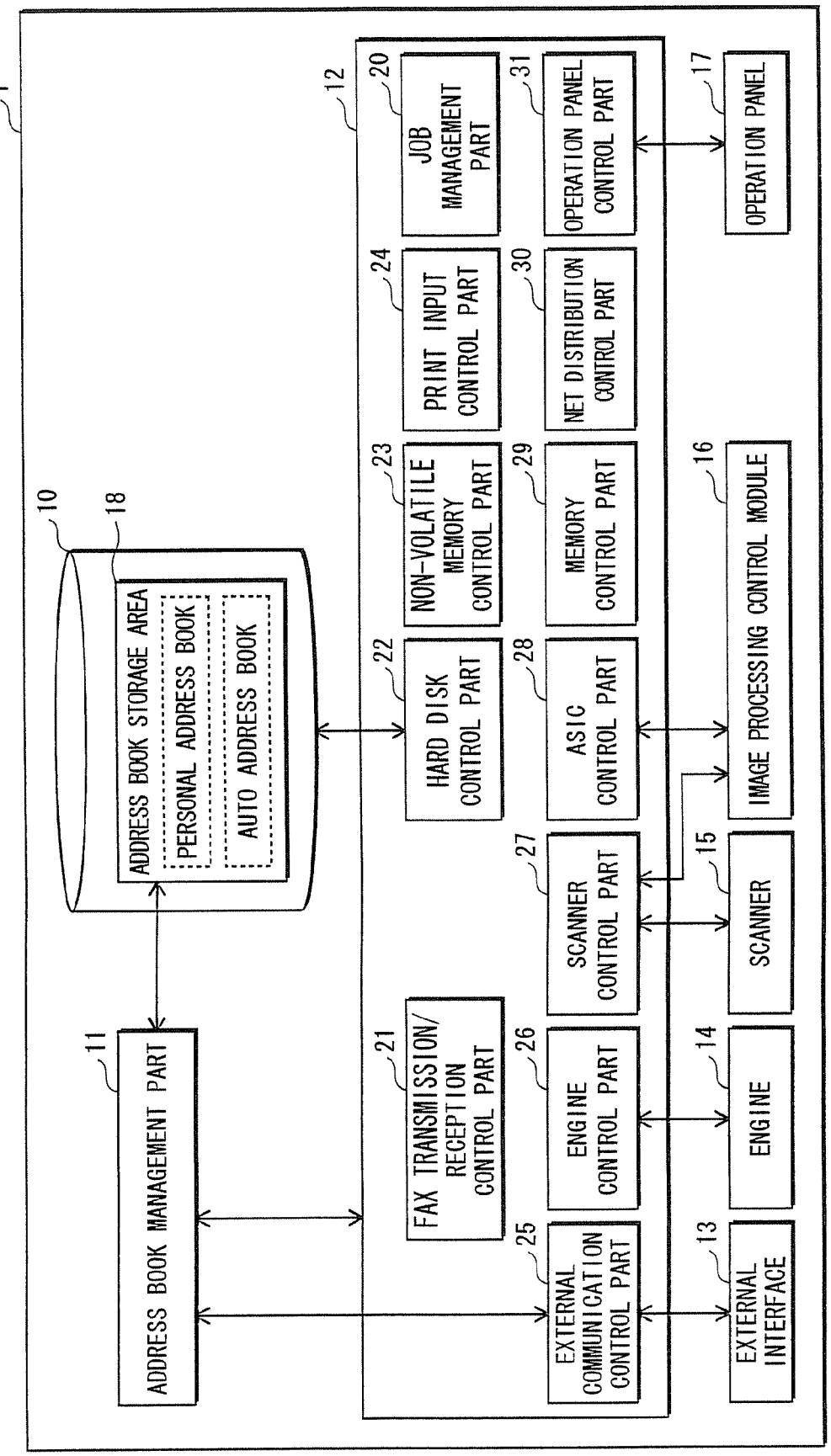
FIG. 2 shows an overview of the structure of an image transmission apparatus 1.

FIG. 2 shows an overview of the structure of the image transmission apparatus 1.

As shown in FIG. 2, the image transmission apparatus 1 of the present embodiment is composed of a storage part 10, an address book management part 11, a controller 12, an external interface 13, an engine 14, a scanner 15, an image processing control module 16, and an operation panel 17.

Here, each of the external interface 13, the engine 14, the scanner 15, the image processing control module 16, the operation panel 17 and such is a function unit that achieves its functions by being controlled by the controller 12. Note that these function units are conventional technology, and therefore a description thereof is omitted.

The storage part 10 is a storage medium such as a hard disk drive, and stores various image data such as image data generated by scanning a document and image data received from an external source. The storage part 10 includes an address book storage area 18 for storing data of a personal address book, data of an auto address book or the like received over the network 4. Here, the personal address book is a list of names and transmission methods in association, the names being names of destination candidates as customized by senders. The auto address book is a list of names of destination candidates who have registered a recipient setting. Here, each name of a destination candidate is a proper noun, or a limiting element thereof, for specifying the destination candidate, such as a personal name, a company name, a professional affiliation, and title of the destination candidate. Furthermore, a recipient setting refers to a user pre-registering, in the address server 2, a reception method that is a convenient way for him/her to receive image data. This makes it possible for a sender, when transmitting image data in accordance with the recipient setting, to transmit the image data to a destination that is thought to be the most convenient by the recipient using a transmission method that conforms with the preferences of the recipient.

The address book management part 11 downloads data of a personal address book and data of an auto address book from the address server 2 and stores the downloaded data of the address books in the address book storage area 18. More specifically, based on the user ID of a user who has logged in, the address book management part 11 downloads the data of the personal address book of the user and the data of the auto address book with a predetermined timing, such as directly after the user logs in. The personal address book is displayed on the operation panel, and a destination is selected therefrom by the user (hereinafter referred to as the sender). Upon the selection being received from the sender, the address book management part 11 extracts the corresponding transmission method from the data of the personal address book, and has the image data transmitted in accordance with the extracted transmission method. Here, if a "follow recipient setting" setting has been made in the transmission method extracted from the data of the personal address book, the address book management part 11 downloads a newest reception method designated by the recipient setting registered in correspondence with the received destination name from the address server 2, and transmits the image data in accordance with the downloaded reception method. When registering to the personal address book, the user is made to select whether or not to follow the recipient setting. When the user makes a selection that the user setting is not to be followed, the address book management part 11 receives and registers a destination name and a transmission method. When the user makes a selection that the user setting is to be followed, the address book management part 21 displays a list of destination names contained in the data of the auto address book stored in the address book storage area 18, has the user select a destination name, and registers the selected destination name in correspondence with an indication showing that the recipient setting is to be followed. Note that details of image data transmission and personal address book registration are given later.

When an instruction is received from the sender to display the auto address book, the address book management part 11 downloads the data of the auto address book from the address server 2, and stores the data of the auto address book in the address book storage area 18. The auto address book is then displayed on the operation panel, and a destination name is selected therefrom by the sender. Upon the selection being received, the address book management part 11 downloads, from the address server 2, the new reception method designated by the recipient setting registered in association with the received destination name, and transmits the image data in accordance with the new reception method.

The controller 12 is composed of control software, and hardware such as a CPU or a work memory, and includes a job management part 20 that manages the job execution order, data of each job, and such. The controller 12 also includes function-specific control parts, each of which controls the operations and the like of a corresponding one of the function units. These function-specific control parts include a FAX transmission/reception control part 21, a hard disk control part 22, a nonvolatile memory control part 23, a print input control part 24, an external communication control part 25, an engine control part 26, a scanner control part 27, an ASIC control part 28, a memory control part 29, a network distribution control part 30, and an operation panel control part 31. Note that these function-specific control parts are conventional technology, and therefore a description thereof is omitted.

Figure 3:
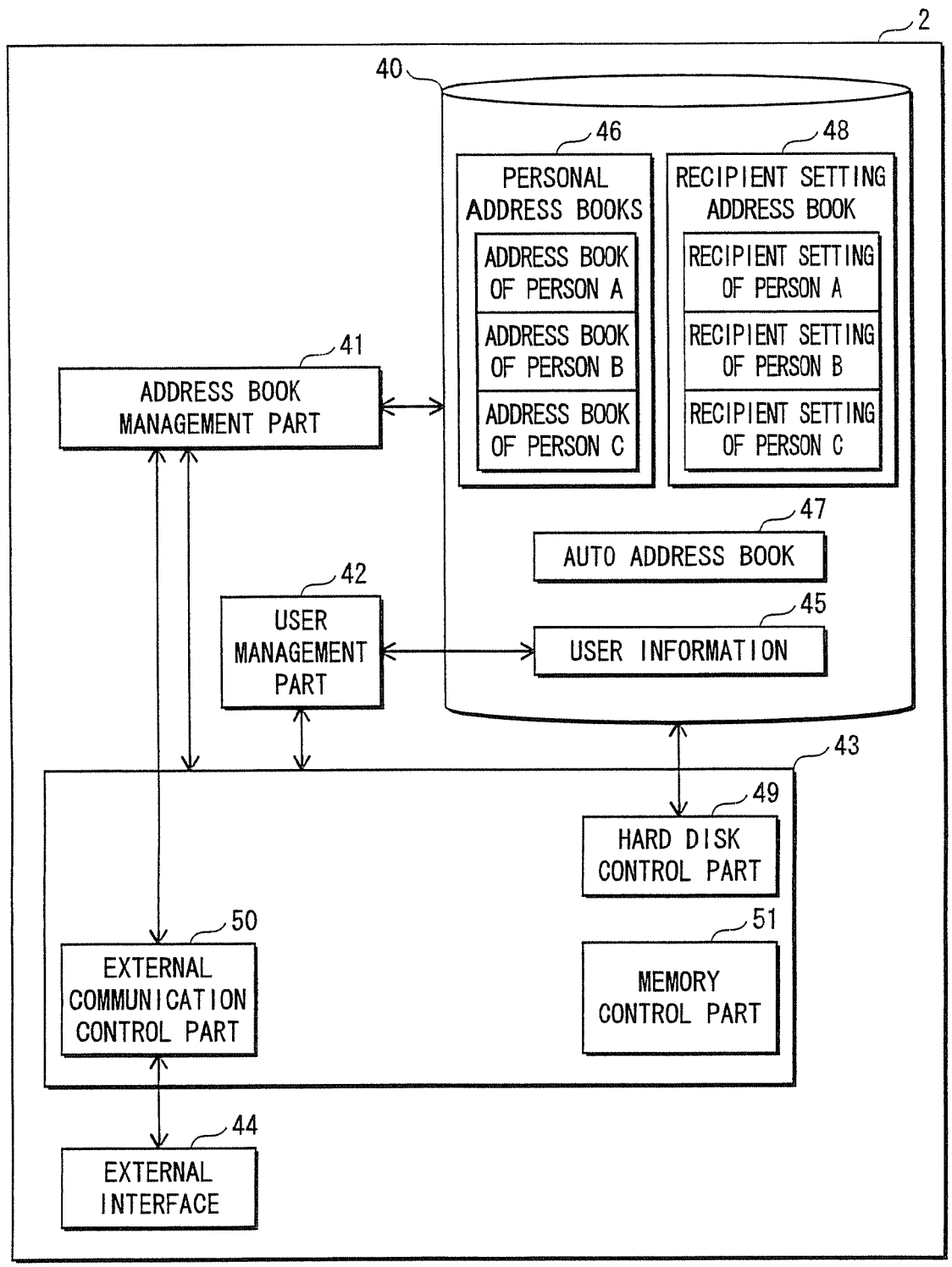
FIG. 3 shows an overview of the structure of an address server 2.

FIG. 3 shows an overview of the structure of the address server 2.

As shown in FIG. 3, the address server 2 in the present embodiment is composed of a storage part 40, and address book management part 41, a user management part 42, a controller 43, and an external interface 44.

Here, the external interface 44 is a function unit that realizes its functions by being controlled by the controller 43. Note that the function units are conventional technology, and therefore a description thereof is omitted.

The storage part 40 is a storage medium such as a hard disk drive, and stores user information 45, a personal address book 46, an auto address book 47, and a recipient setting address book 48. Here, the user information 45 may be information relating to each user, or authentication-use data such as a password or a login name necessary for login authentication. Furthermore, the recipient setting address book 48 is data of a list of recipient settings registered by users from the point of view of being a recipient.

The address book management unit 41 manages the personal address book 46, the auto address book 47 and the recipient setting address book 48 stored in the storage part 40. Upon receiving a request from the image transmission apparatus 1, the address book management unit 41 transmits the personal address book 46 and the auto address book 47 to have them downloaded. Upon receiving a registration of a user setting from a user, the address book management unit 41 updates the auto address book 47 and the recipient setting address book 48. Furthermore, when a recipient is selected from the personal address book 46 by a sender in the image transmission apparatus 1, and the corresponding transmission method in the personal address book 46 is set as "follow recipient setting", or when the recipient is selected from the auto address book 47, the address book management unit 41 transmits the new recipient setting registered in association with the selected transmission name in the recipient setting address book 48, to the image transmission apparatus 1 to have the new recipient setting downloaded to the image transmission apparatus 1.

The user management part 42 manages users by carrying out functions such as authentication processing using the user information 45 stored in the storage part 40, in response to a request for login authentication from the image transmission apparatus 1.

The controller 43 is composed of control software and hardware such as a CPU or a work memory, and includes function-specific control parts, specifically, a hard disk control part 49, an external communication control part 50, a memory control part 51, and so on. Note that these function-specific control parts are conventional technology, and therefore a description thereof is omitted.

Operations

Figure 4:
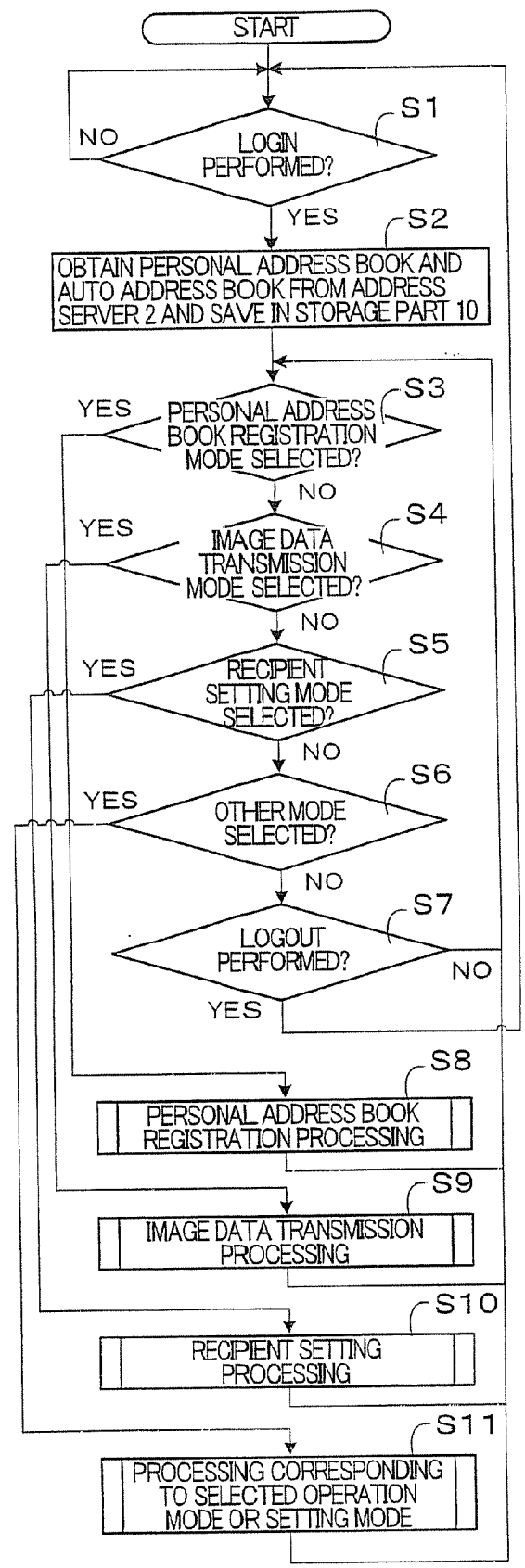
FIG. 4 shows the procedure for overall processing by the image transmission apparatus 1 of an embodiment of the present invention.

FIG. 4 shows the procedure for overall processing by the image transmission apparatus 1 of the present embodiment.

The following describes procedure for overall processing with use of FIG. 4.

(1) The image transmission apparatus 1 waits until a user logs in (step S1).

(2) When a user logs in, the image transmission apparatus 1 obtains data of the personal address book of the user and data of the auto address book from the address server 2, and stores the obtained data of the personal address book and the obtained data of the auto address book in the storage part 10 (step S2).

(3) The image transmission apparatus 1 waits for one of the operation modes to be selected by the user. More specifically, the image transmission apparatus 1 waits for either personal address book registration mode to be selected (step S3), image data transmission mode to be selected (step S4), recipient setting mode to be selected (step S5), or another mode to be selected (step S6).

Here, examples of the other modes that may be selected are various operation modes such as scan mode, print mode, copy mode, and FAX mode, and various setting modes. These modes are conventionally known, and therefore a description thereof is omitted here.

(4) The image transmission apparatus 1 waits for the user to log out (step S7).

(5) Upon the personal address book registration mode being selected (step S3: YES), the image transmission apparatus 1 performs personal address book registration processing (step S8).

(6) Upon image data transmission mode being selected (step S4: YES), the image transmission apparatus 1 performs image data transmission processing (step S9).

(7) Upon recipient setting mode being selected (step S5: YES), the image transmission apparatus 1 performs recipient setting processing (step S10).

(8) Upon another mode being selected (step S6: YES) the image transmission apparatus 1 performs processing corresponding to the selected operation mode or setting mode (step S11).

Figure 5:
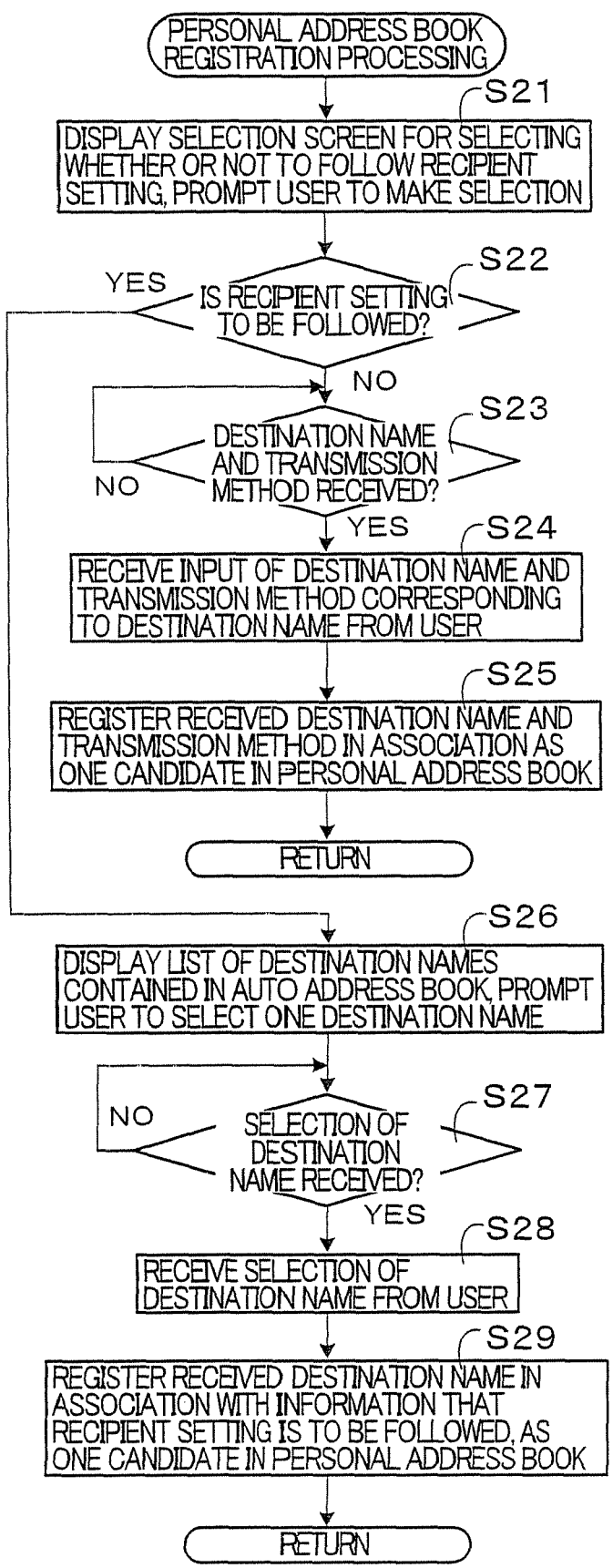
FIG. 5 shows the procedure for personal address book registration processing.

FIG. 5 shows the procedure for personal address book registration processing at step S7.

The following describes the procedure for personal address book registration processing with use of FIG. 5.

(1) Upon personal address book registration mode being selected, the image transmission apparatus 1 displays a selection screen for selecting whether the recipient setting is to be followed or not, on a liquid crystal display portion or the like of the liquid crystal panel, and prompts the user to select whether the recipient setting is to be followed or not (step S21).

Figure 6:
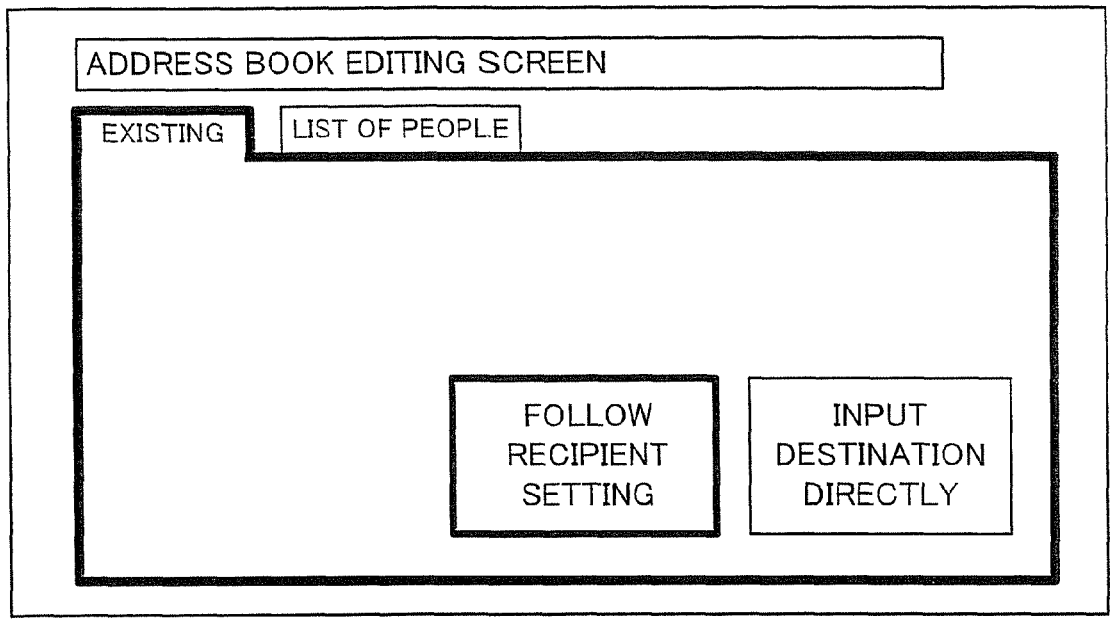
FIG. 6 shows a selection screen for selecting whether or not to follow a recipient setting.

FIG. 6 shows a selection screen 60 displayed for selecting whether the recipient setting is to be followed or not at step S21.

In the selection screen 60 shown in FIG. 6, if the user touches a panel key 61 on which appears "FOLLOW RECIPIENT SETTING", notification to the effect that recipient setting will be followed is received the by image transmission apparatus 1. Alternatively, if the user touches a panel key 62 on which appears "INPUT DESTINATION DIRECTLY", notification to the effect that recipient setting will be followed is received by the image transmission apparatus 1, and the image transmission apparatus 1 switches the display to a destination direct input screen for receiving input of a destination name and a transmission method. When the user touches a tab 63 on which appears "LIST OF PEOPLE", a list of destination names contained in the auto address book is displayed, and notification to the effect that recipient setting will not be followed is received by the image transmission apparatus 1. When the user touches a tab 64 on which appears "EXISTING", the display returns to the same state as before the tab 63 was touched.

(2) The image transmission apparatus 1 waits for a selection of whether or not to follow the recipient setting from the user (step S22).

(3) In the case of receiving a selection to not follow the recipient setting, the image transmission apparatus 1 waits to receive input of a destination name and a transmission method from the user (step S23).

(4) The image transmission apparatus 1 receives input of a destination name to be registered as one candidate in the personal address book, and a transmission method to correspond to the input destination name, from the user (step S24).

(5) The image transmission apparatus 1 registers the destination name and the transmission method received at step S24, as one candidate in the personal address book (step S25).

(6) In the case of receiving a selection to follow the recipient setting, the image transmission apparatus 1 displays a list of destinations names contained in the data of the auto address book obtained from the address server 2 at step S2 in FIG. 4, on the liquid crystal display portion or the like of the liquid crystal panel, and prompts the user to select one destination name from the displayed list to register in the personal address book (step S26).

Figure 7:
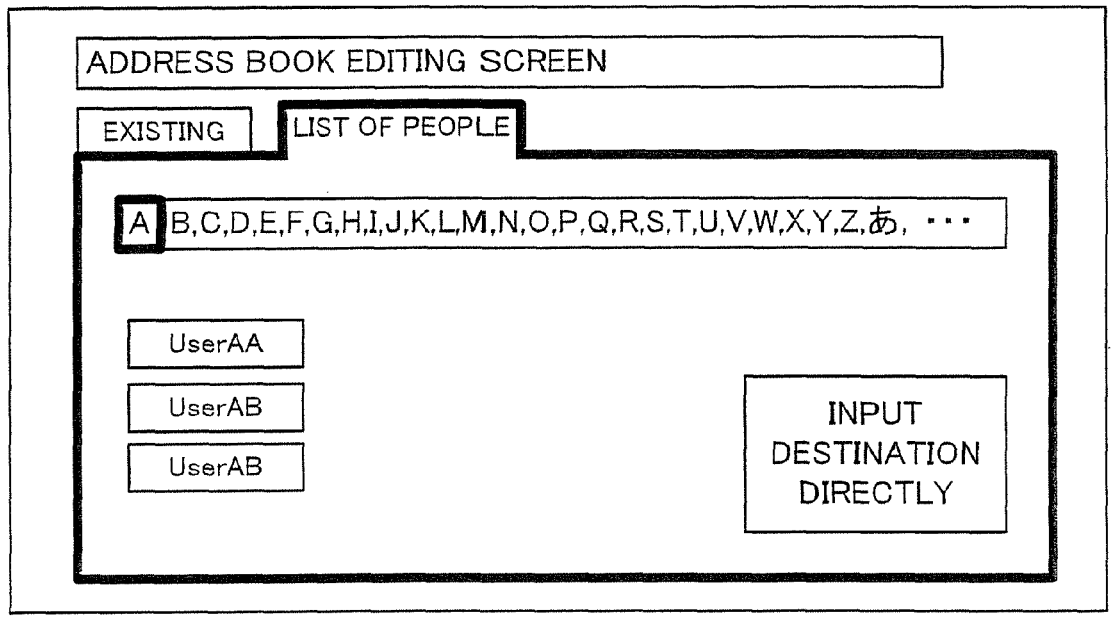
FIG. 7 shows a display example of a list of destination names contained in an auto address book.

FIG. 7 shows a display example of a list 70 of destination names contained in the auto address book in step S26.

Upon the user touching any one of the characters on a panel key 71 on which appears the letters of the alphabet, Japanese characters, etc., the image transmission apparatus 1 presents a list of destination names that start with the touched letter or character. One of the destination names is then selected by the user touching one of panel keys such as panel keys 72 to 74 which show the listed destination names.

(7) The image transmission apparatus 1 waits to receive a selection of a destination name from the user (step S27).

(8) The image transmission apparatus 1 receives a selection of a destination name from the user (step S28).

(9) The image transmission apparatus 1 registers the destination name received at step S28 in association with an indication that the recipient setting is to be followed, as one candidate in the personal address book (step S29).

Figure 8:
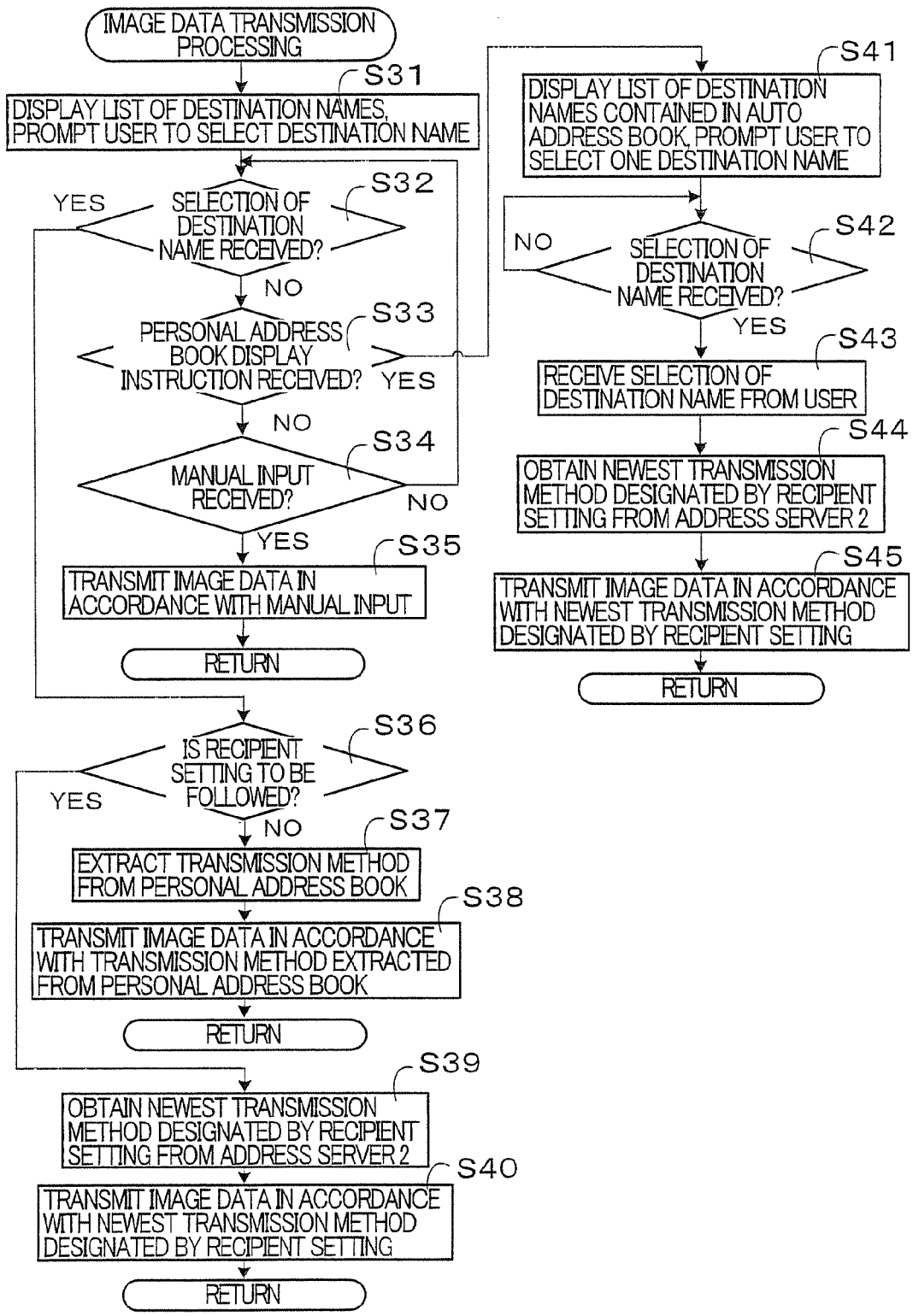
FIG. 8 shows the procedure for image data transmission processing.

FIG. 8 shows the procedure for image data transmission processing in step S8.

The following describes the procedure for image data transmission processing with use of FIG. 8.

(1) Upon image data transmission mode being selected, the image transmission apparatus 1 displays a list of destination names registered in the data of the personal address book stored in the storage part 10, on the liquid crystal display portion or the like of the liquid crystal panel, and prompts the user to select a destination name (step S31).

FIG. 9 shows a display example of a list 80 of destination names in step S31.

In the list 80 shown in FIG. 9, upon the user touching a panel key 81 on which is written "Go to auto address book input screen", the image transmission apparatus 1 receives an instruction to display the auto address book, and displays a list of the destination names contained in the auto address book.

(2) The image transmission apparatus 1 waits to receive a selection of a destination name from the user (sender) (step S32).

(3) The image transmission apparatus 1 waits to receive an auto address book display instruction from the sender (step S33).

(4) The image transmission apparatus 1 waits to receive input of information specifying a destination, such as a FAX number, by direct manual input through the operation panel or the like (step S34).

(5) Upon receiving a manual input of information specifying a destination, the image transmission apparatus 1 transmits image data in accordance with the information (step S35).

(6) Upon receiving the selection of a destination name, the image transmission apparatus 1 refers to the data of the personal address book stored in the storage part 10 to judge whether or not "follow recipient setting" is set for the received destination name (step S36).

(7) When "follow recipient setting" is not set, the image transmission apparatus 1 extracts the transmission method stored in association with the destination name at step S32 from the data of the personal address book stored in the storage part 10 at step S2 in FIG. 4 (step S37).

(8) The image transmission apparatus 1 transmits the image data in accordance with the transmission method extracted from the data of the personal address book at step S37 (step S38).

(9) When "follow recipient setting" is set, the image transmission apparatus 1 obtains, from the address server 2, the newest transmission method designated by the recipient setting registered in association with the destination name received at step S32 (step S39).

(10) The image transmission apparatus 1 transmits the image data in accordance with the newest transmission method designated by the recipient setting obtained from the address server 2 at step S39 (step S40).

(11) Upon receiving an instruction to display the auto address book, the image transmission apparatus 1 displays a list of destination names contained in the data of the auto address book obtained from the address server 2 at step S2 in FIG. 4, on the liquid crystal display portion or the like of the liquid crystal panel, and prompts the user to select a destination name (step S41).

FIG. 10 shows a display example of a list 90 of destination names contained in the auto address book at step S41.

Note that the manner in which the destination name is selected from the list 90 shown in FIG. 10 is the same as for the list 70 shown in FIG. 7.

(12) The image transmission apparatus 1 waits to receive a selection of a destination name from the user (step S42).

(13) The image transmission apparatus 1 receives a selection of a destination name from a user (step S43).

(14) The image transmission apparatus 1 obtains, from the address server 2, the newest transmission method designated by the recipient setting registered in association with the destination name received at step S43 (step S44).

(15) The image transmission apparatus 1 transmits the image data in accordance with the newest transmission method designated by the recipient setting obtained from the address server 2 at step S44 (step S44).

Figure 11:
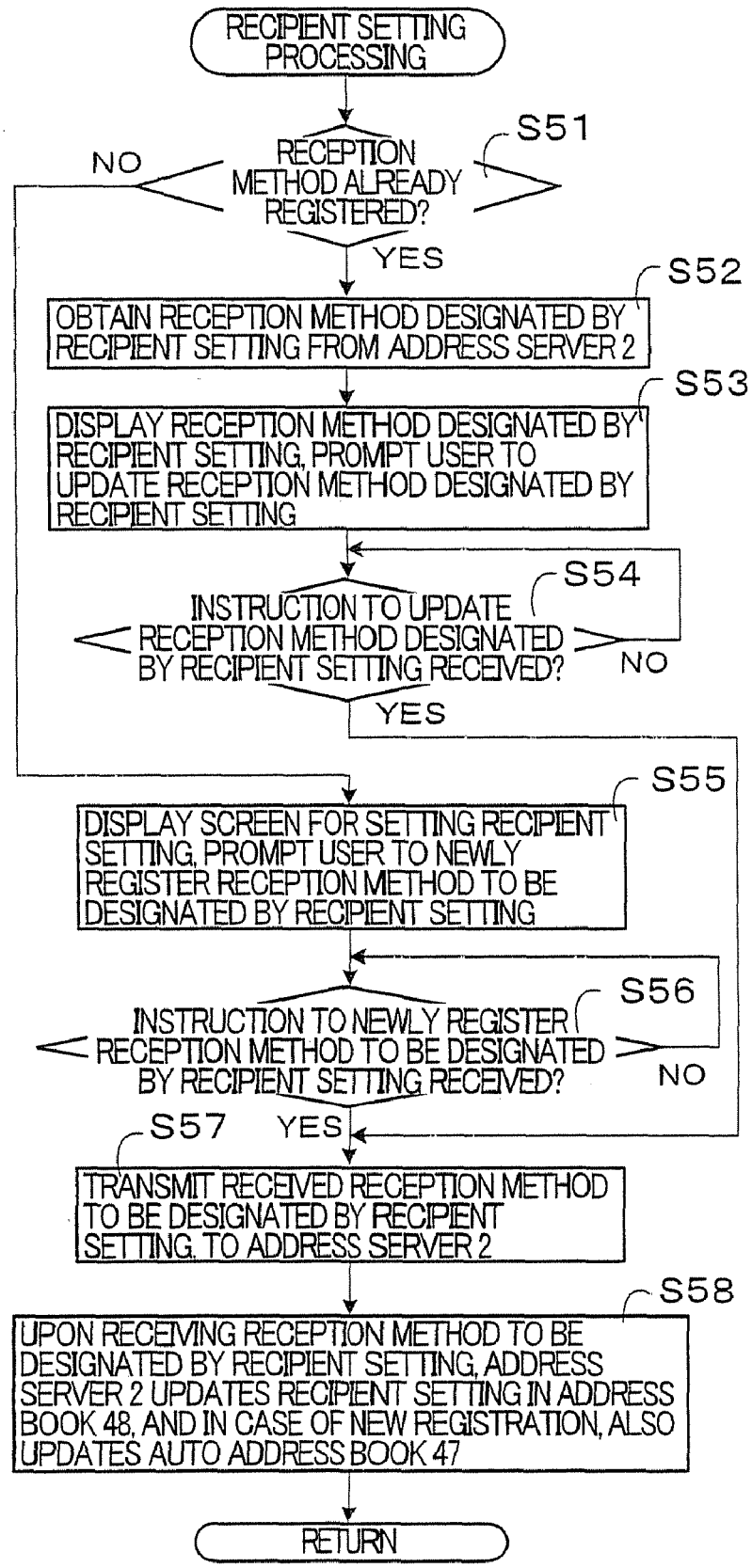
FIG. 11 shows the procedure for recipient setting processing.

FIG. 11 shows the procedure for recipient setting processing in step S9.

The following describes the procedure for recipient setting processing with use of FIG. 11.

(1) Upon recipient setting mode being selected, the image transmission apparatus 1 judges whether or not a recipient setting designating a reception method has already been registered in the address server 2 in association with the user who logged on at step S1 in FIG. 4 (step S51).

(2) In the case that a recipient setting designating a reception method has already been registered, the image transmission apparatus 1 obtains the reception method designated by the recipient setting, from the address server 2 (step S52).

(3) The image transmission apparatus 1 displays the reception method designated by the recipient setting obtained at step S52, on the on the liquid crystal display portion or the like of the liquid crystal panel, and prompts the logged-in user to update the reception method designated by the recipient setting (step S53).

(4) The image transmission apparatus 1 waits to receive, from the user, an instruction to update the reception method designated by the recipient setting (step S54).

(5) In the case that a recipient setting designating a reception method has not already been registered, the image transmission apparatus 1 displays a screen for setting the recipient setting, and prompts the user to newly register a reception method to be designated by the recipient setting (step S55).

(6) The image transmission apparatus 1 waits to receive an instruction to newly register the transmission method to be designated by the recipient setting (step S56).

(7) Upon receiving an instruction to update the reception method designated by the recipient setting or an instruction to newly register a reception method to be designated by the recipient setting, the image transmission apparatus 1 transmits the received reception method to be designated by the recipient setting to the address server 2 (step S57).

(8) Upon receiving the information showing the reception method to be designated by the recipient setting, the address server 2 updates the recipient setting address book 48, and in the case of a new registration, also updates the auto address book 47 (step S58).

CONCLUSION

As has been described, according to the present embodiment of the present invention, in an environment where a destination can be arbitrarily selected by a recipient according to recipient settings, in a case such as newly registering a transmission destination in a user's personal address book, a list of names of destination candidates for which recipient settings have been made by the recipient is obtained from the address server and displayed, and a destination candidate can be selected from among the displayed list. This provides high convenience, operability and reliability over conventional techniques.

A program capable of causing a computer to execute operations of the present embodiment may be recorded on a computer-readable recording medium, and the recording medium may be subjected to distribution and trade. Furthermore, the program may be distributed via a network and subjected to trade, or may be presented to a user by being displayed on a display apparatus or by being printed.

Here, the computer-readable recording medium may be a detachable recording medium such as a floppy disk, a CD (compact disk), an MO (mobile optical), a DVD (digital versatile disk) or a memory card, or may be a fixed recording medium such as a hard disk or a semiconductor memory, but is not limited to any type of recording medium in particular.

INDUSTRIAL APPLICABILITY

The present invention can be widely applied to a technical field of image transmission apparatuses including MFPs and the like.

The present invention provides an image transmission apparatus that when a user, for instance, newly registers a transmission destination in an address book, saves the user from having to manually input the destination, and thus eliminates bothersome operations, lessens the likelihood of input errors, is user-friendly, and is highly convenient, operable and reliable. The present invention therefore has extremely high usage potential in industry.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image transmission apparatus operable for a sender to transmit image data to a recipient, in accordance with a first address book registered in an address server computer, the first address book including recipient settings of destination names and transmission methods set by users, the image transmission apparatus comprising:

a processor;

a destination name obtaining part operable to obtain, from the address server computer, a list of the destination names that correspond to users who have registered a transmission method in the first address book;

a selection receiving part operable to, when the sender registers the recipient in a second address book, receive from the sender a selection of whether or not to follow the transmission method registered in the first address book when transmitting the image data;

a first registration part operable to, if the selection receiving part has received a selection to not follow the transmission method registered in the first address book, receive from the sender (a) a destination name to be registered for the recipient and (b) a transmission method to correspond to the received destination name;

a second registration part operable to, if the selection receiving part has received a selection to follow the transmission method registered in the first address book, receive, from the sender, a selection of one of the destination names from the obtained list of the destination names, as the destination name to be registered for the recipient together with the transmission method registered in the first address book, and to register the selection the second address book; and a transmitting part operable to, when transmitting the image data, if the destination name of the recipient selected by the user is registered by the first registration part, transmit the image data in accordance with the transmission method registered in the second address book, and, if the destination name of the recipient selected by the user is registered by the second registration part, transmit the image data according to the transmission method registered in the first address book.

2. The image transmission apparatus of claim 1, wherein the second registration part, if the selection receiving part has received the selection to follow the transmission method registered in the first address book, displays the list of the destination names obtained by the obtaining unit, and prompts the user to select one of the destination names from the displayed list.

3. The image transmission apparatus of claim 1, wherein the address server computer has registered therein data of a personal address book that is a list of the destination candidates and is one of a plurality of personal address books each registered by a different one of a plurality of senders, and the image transmission apparatus further comprises:
a candidate obtaining part operable to obtain, from the address server computer, the data of the personal address book registered by the sender, when the sender logs in;
a transmission instruction receiving part operable to display the personal address book registered by the sender, and receive, from the user, an instruction showing that the image data is to be transmitted to a destination selected from the personal address book.

4. The image transmission apparatus of claim 3, wherein the destination name obtaining part obtains the destination name list in addition to the data of the personal address book when the sender logs in.

5. The image transmission apparatus of claim 4, wherein the transmission instruction receiving part further displays the obtained list of the destination names instead of the personal address book, and receives, from the sender, an instruction showing that the image data is to be transmitted to the recipient corresponding to a destination name selected from the list of destination names, and the transmitting part transmits the image data in accordance with the transmission method registered in the address server computer corresponding to the destination name selected from the list of destination names.

6. The image transmission apparatus of claim 1, wherein the image transmission apparatus further comprises:
a recipient setting part operable to set, in the address server computer, a preferred transmission method for transmitting image data to the sender in a case of the sender being a recipient of image data.

7. A registration method used when registering information in an image transmission apparatus, the image transmission apparatus being operable for a sender to transmit image data to a recipient, in accordance with a first address book registered in an address server computer, the first address book including recipient settings of destination names and transmission methods set by users, the registration method comprising:
a destination name obtaining step of obtaining, from the address server computer, a list of the destination names that correspond to users who have registered a transmission method in the first address book;
a selection receiving step of, when the sender registers the recipient in the second address book, receiving from the sender a selection of whether or not to follow the transmission method registered in the first address book when transmitting the image data;
a first registration step of, if a selection to not follow the transmission method registered in the first address book has been received in the selection receiving step, receiving from the sender (a) a destination name to be registered for the recipient and (b) a transmission method to correspond to the received destination name;
a second registration step of, if a selection to follow the transmission method registered in the first address book has been received in the selection receiving step, receive, from the sender, a selection of one of the destination names from the obtained list of the destination names, as the destination name to be registered for the recipient together with the transmission method in the first address book, and to register the selection in the second address book; and
a transmission step of, when transmitting the image data, if the destination selected by the user has been registered in the first registration step, transmit the image data in accordance with the transmission method registered in the second address book, and, if the destination selected by the user has been registered in the second registration step, transmit the image data according to the transmission method registered in the first address book.

8. A non-transitory computer readable medium having stored therein a registration program for executing registration of information in an image transmission apparatus, the image transmission apparatus being operable for a sender to transmit image data to a recipient, in accordance with a first address book registered in an address server computer, the first address book including recipient settings of destination names and transmission methods set by users, the registration program causing the image transmission apparatus to execute:
a destination name obtaining step of obtaining, from the address server computer, a list of the destination names that correspond to users who have registered a transmission method in the first address book;
a selection receiving step of, when registers the recipient in the second address book, in a case of the user being a sender of the image data, receiving from the sender a selection of whether or not to follow the transmission method registered in the first address book when transmitting the image data;
a first registration step of, if a selection to not follow the transmission method registered in the first address book has been received in the selection receiving step, receiving from the sender (a) a destination name to be registered for the recipient and (b) a transmission method to correspond to the received destination name;
a second registration step of, if a selection to follow the transmission method registered in the first address book has been received in the selection receiving step, receive, from the sender, a selection of one of the destination names from the obtained list of the destination names, as the destination name to be registered for the recipient together with the transmission method in the first address book, and to register the selection in the second address book; and
a transmission step of, when transmitting the image data, if the destination selected by the user has been registered in the first registration step, transmit the image data in accordance with the transmission method registered in the second address book, and, if the destination selected by the user has been registered in the second registration step, transmit the image data according to the transmission method registered in the first address book.

* * * * *